US009415683B2

(12) United States Patent
Walter et al.

(10) Patent No.: US 9,415,683 B2
(45) Date of Patent: Aug. 16, 2016

(54) VEHICLE HAVING A GEARSHIFT ELEMENT ARRANGED ON THE STEERING WHEEL

(75) Inventors: Martin Walter, Munich (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 402 days.

(21) Appl. No.: 13/367,691

(22) Filed: Feb. 7, 2012

(65) Prior Publication Data

US 2012/0133501 A1   May 31, 2012

Related U.S. Application Data

(63) Continuation of application No. PCT/EP2010/005820, filed on Sep. 23, 2010.

(30) Foreign Application Priority Data

Oct. 17, 2009   (DE) .......................... 10 2009 049 753

(51) Int. Cl.
| | |
|---|---|
| *B60Q 1/00* | (2006.01) |
| *B60K 20/06* | (2006.01) |
| *B60Q 1/14* | (2006.01) |
| *F16H 59/02* | (2006.01) |
| *F16H 63/42* | (2006.01) |

(52) U.S. Cl.
CPC .............. *B60K 20/06* (2013.01); *B60Q 1/1469* (2013.01); *B60Q 1/1476* (2013.01); *B60Q 1/1484* (2013.01); *F16H 59/0204* (2013.01); *F16H 63/42* (2013.01); *F16H 2059/0243* (2013.01); *Y10T 74/2003* (2015.01)

(58) Field of Classification Search
CPC ........ B63F 13/06; B63H 21/213; B60K 37/06
USPC .............. 340/456, 426.31, 465, 467; 74/335, 74/473.12, 552; 701/55, 64, 66
See application file for complete search history.

(56) References Cited

U.S. PATENT DOCUMENTS

| | | | | | |
|---|---|---|---|---|---|
| 4,578,592 | A | * | 3/1986 | Nakazawa et al. | ........... 307/10.1 |
| 5,225,578 | A | * | 7/1993 | Suganuma et al. | ........... 552/298 |
| 5,569,893 | A | * | 10/1996 | Seymour | .................... 200/61.54 |
| 5,855,144 | A | * | 1/1999 | Parada | ............................ 74/552 |

(Continued)

FOREIGN PATENT DOCUMENTS

| | | |
|---|---|---|
| CN | 101189157 A | 5/2008 |
| DE | 10 2004 022 634 A1 | 12/2005 |

(Continued)

OTHER PUBLICATIONS

International Search Report dated Jan. 10, 2011 with English translation (four (4) pages).

(Continued)

*Primary Examiner* — Tai T Nguyen
(74) *Attorney, Agent, or Firm* — Crowell & Moring LLP

(57) ABSTRACT

A vehicle has a transmission and a gearshift element pivotally arranged on a steering wheel of the vehicle. By actuating the gearshift element, the transmission is shiftable in an electrically controlled manner from one transmission gear to a next-higher or a next-lower transmission gear. At least one electric switch element and/or at least one optical display device is arranged on the gearshift element.

17 Claims, 1 Drawing Sheet

(56) References Cited

U.S. PATENT DOCUMENTS

| | | | | |
|---|---|---|---|---|
| 5,949,149 | A * | 9/1999 | Shitanaka | B60Q 1/0082 200/5 R |
| 6,474,186 | B1 * | 11/2002 | Vollmar | 74/335 |
| 7,217,894 | B2 | 5/2007 | Miyako et al. | |
| 7,278,367 | B1 * | 10/2007 | Gonring et al. | 114/144 R |
| 7,703,570 | B2 * | 4/2010 | Ringger | B60K 20/06 180/336 |
| 7,775,884 | B1 * | 8/2010 | McCauley | 463/39 |
| 2004/0050673 | A1 | 3/2004 | Takahashi et al. | |
| 2005/0098417 | A1 * | 5/2005 | Miyako | B60K 35/00 200/61.54 |
| 2005/0247549 | A1 | 11/2005 | Wahl et al. | |
| 2006/0169085 | A1 * | 8/2006 | Peuster | 74/473.12 |
| 2007/0204710 | A1 * | 9/2007 | Mandou et al. | 74/335 |
| 2008/0173127 | A1 | 7/2008 | Ackert et al. | |
| 2010/0326229 | A1 * | 12/2010 | Gerharz | H01H 21/22 74/492 |
| 2012/0096979 | A1 * | 4/2012 | Trujillo Linke | 74/552 |

FOREIGN PATENT DOCUMENTS

| | | |
|---|---|---|
| DE | 10 2004 060 979 A1 | 4/2006 |
| DE | 10 2005 038 855 A1 | 2/2007 |
| DE | 10 2007 062 072 A1 | 6/2009 |

OTHER PUBLICATIONS

German Office Action dated Jul. 16, 2010 with English translation (six (6) pages).
Chinese Office Action dated Feb. 8, 2014 (Seven (7) pages).
Chinese Office Action dated Oct. 27, 2014, with English translation (Four (4) pages).
Chinese Office Action dated May 21, 2015, with English translation (Fifteen (15) pages).
Chinese Office Action issued in Chinese counterpart application No. 201080029186.3 dated Dec. 8, 2015, with English translation (Nine (9) pages).

* cited by examiner

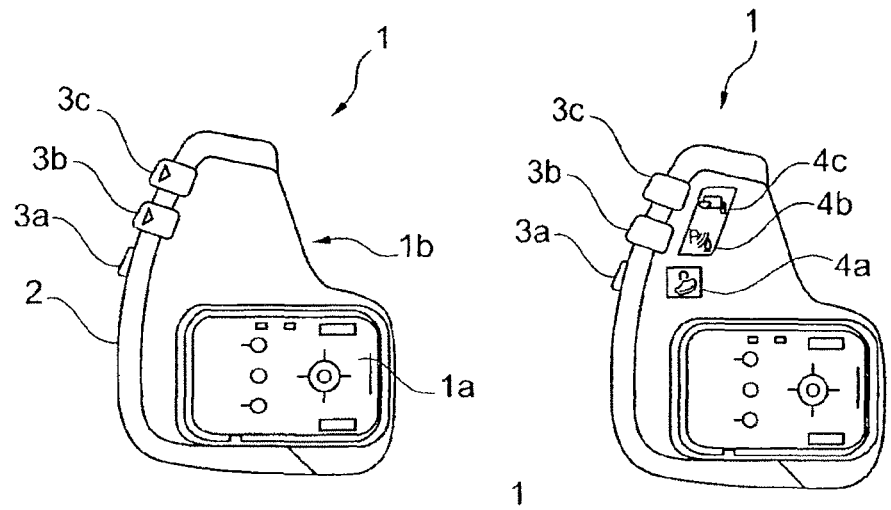
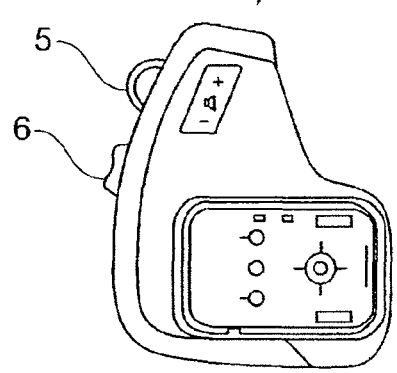
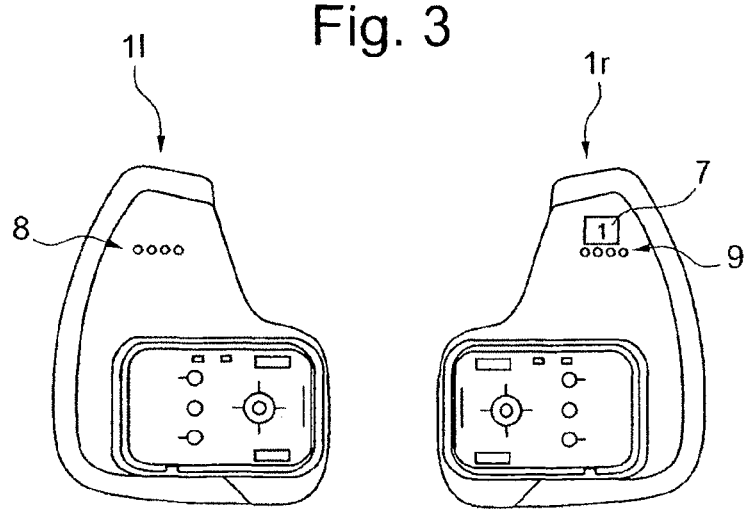

VEHICLE HAVING A GEARSHIFT ELEMENT ARRANGED ON THE STEERING WHEEL

CROSS-REFERENCE TO RELATED APPLICATIONS

This application is a continuation of PCT International Application No. PCT/EP2010/005820, filed Sep. 23, 2010, which claims priority under 35 U.S.C. §119 from German Patent Application No. DE 10 2009 049 753.6, filed Oct. 17, 2009, the entire disclosures of which are herein expressly incorporated by reference.

BACKGROUND AND SUMMARY OF THE INVENTION

The present invention relates to a vehicle and, more particularly, to a vehicle having an electrically shiftable transmission and a gearshift element pivotally arranged on a steering wheel of the vehicle.

Modern sporty vehicles, as, for example, some vehicles manufactured by BMW, have so-called "shift rockers" or "paddle shifters", in addition to a gearshift element arranged in the area of the center console. The shift rockers are provided for the sequential upshifting and downshifting of transmission gears. A "shift rocker" is an actuating element which, for example, may have the shape of a lever or a design similar to that of a plate and is pivotally arranged on the steering wheel, i.e. it turns together with the steering wheel during the steering. In BMW vehicles, the shift rockers are arranged on the side of the steering wheel facing away from the driver. Their arrangement is very advantageous ergonomically because their touch or grip regions project upward beyond the upper steering wheel spokes, are therefore in the driver's direct field of view and can easily be reached by the driver's hand. Such shift rockers arranged on the steering wheel permit a particularly sporty driving because the driver can shift "manually" without removing his hand from the steering wheel.

It is an object of the invention to provide a vehicle having at least one gearshift element pivotally arranged in the vehicle, particularly a "shift rocker", which has a functionality that is expanded in comparison to conventional shift rockers.

This and other objects are achieved by a vehicle having a transmission and a gearshift element pivotally arranged on a steering wheel of the vehicle. By actuating the gearshift element, the transmission is shiftable in an electrically controlled manner from one transmission gear to a next-higher or a next-lower transmission gear. At least one electric switch element and/or at least one optical display device is arranged on the gearshift element.

The starting point of the invention is a vehicle having a transmission and at least one gearshift element pivotally arranged on a steering wheel of the vehicle. By actuating the gearshift element, the transmission can be shifted in an electrically controlled manner from one transmission gear to a next-higher or a next-lower transmission gear.

In accordance with the invention, at least one (additional) electric switch element and/or at least one optical display device is arranged on the gearshift element. The gearshift element according to the invention is therefore a multifunctional shift and/or display element which, in addition to being provided for shifting the transmission, is also provided at least for shifting a further function and/or for displaying a status, a driving condition parameter, a gearshifting condition or the like.

The at least one (additional) switch element is preferably designed and arranged such that a force to be applied for actuating the switch element leaves the gearshift element in a non-actuated condition. Thus, it may be provided that the gearshift element can be actuated, particularly pivoted, in the driving direction and/or against the driving direction. It may, for example, be provided that, for shifting into a lower transmission gear, the gearshift element has to be pressed into the driving direction and, for shifting into a higher transmission gear, the gearshift element has to be pulled toward the rear, i.e. against the driving direction, in the direction of the driver. In order to avoid a gear shifting operation being triggered unintentionally by actuating the additional switch element, it may be provided that the actuating direction of the at least one additional switch element is essentially transverse to the longitudinal direction of the vehicle, in a vertical direction, or approximately parallel to a vertical direction of the vehicle. The force required for actuating the switch element should therefore have no or only a very small force component parallel to the direction of the actuating force of the gearshift element.

In order to achieve the above, the additional switch element can be arranged in an edge area, particularly on a lateral edge of the gearshift element, i.e. an edge facing the vehicle side. As an alternative thereto, the switch element may be arranged on an upper edge of the gearshift element, i.e. an edge facing the vehicle roof, or on a lower edge of the gearshift element, i.e. an edge facing the vehicle floor.

The term "switch element" should be interpreted in an extremely broad fashion. The switch element may, for example, be a simple push-button switch or a double button switch or rocker switch. Such double button switches or rocker switches can be encountered, for example, in the case of multi-function steering wheels of BMW vehicles, where they are used for adjusting the volume of the audio system. As an alternative, the switch element may be a knurled wheel or a knurled wheel segment. Naturally, differently designed switch elements are also contemplated for use herein.

It may be provided that, by actuating the switch element several times, different selection or information menus of an electronic selection and/or information system can be selected.

According to a further aspect of the invention, the display device has a light-emitting diode. As an alternative, the display device may simply be formed by one or more light-emitting diodes. In this case, conventional light-emitting diodes or so-called organic light-emitting diodes (OLEDs) can be used.

As an alternative or in addition, the display device may have a display, particularly an organic light-emitting diode display (OLED display) or a luminous foil by which various symbol systems can be represented. The display device may also be integrated in the switch element, for example, in a push-button switch. The display device is preferably arranged on a front face of the gearshift element or of the additional switch element facing the driver.

The display device may be provided, for example, for displaying a gearshifting recommendation, for example, of a currently particularly economical transmission gear, etc. As an alternative, various other driving condition parameters may also be displayed, such as the currently engaged transmission gear.

Furthermore, several additional switch elements and several display devices may be provided on the gearshift element. Precisely one display device respectively may be assigned to individual or all additional switch elements, which display device, for example, shows the function that is triggered by actuating the corresponding additional switch element.

If a display device is used as a "shift point display", for example, a multicolored symbol system can also be used. Thus, for example, the following logic may be implemented:

(1) a "green" display means: an optimal rotational speed has been reached;

(2) a "yellow" display means: a shifting can suitably take place as of now;

(3) a "red" display means: a critical rotational speed range; shifting to a higher gear is urgently required.

Furthermore, a left gearshift element and a right gearshift element may be arranged on the steering wheel. The left gearshift element is provided, for example, for downshifting and the right gearshift element is provided, for example, for upshifting of transmission gears, or vice-versa. Correspondingly, a display device may be provided on the left gearshift element, by which display device, if required, the driver is prompted to downshift, and a display device is provided on the right gearshift element, by which display device, if required, the driver is prompted to upshift.

Summarizing, the invention permits a functional expansion of conventional gearshift elements arranged on the steering wheel, specifically in an ergonomically optimally reachable or visible position. An operation of operating elements in the area of the steering wheel is advantageous for the driver because his attention is barely diverted from what is happening on the road.

As a result of a "variable symbol system", several different functions may also be assigned to a switch element additionally arranged on the gearshift element, in which case it is indicated to the driver which function is currently active.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1-4 show various embodiments of a gearshift element according to the invention.

DETAILED DESCRIPTION OF THE DRAWINGS

FIG. 1 illustrates a shift rocker 1. A lower area 1a of the shift rocker 1 is fastened on a side of a steering wheel spoke facing away from the driver or a "central part" of a steering wheel (not shown here in detail). The shift rocker 1 is pivotally arranged on the steering wheel. It may also be provided that the shift rocker 1 can be pivoted in the driving direction, i.e. away from the driver and/or against the driving direction, i.e. toward the driver. An upper area 1b of the shift rocker projects beyond the steering wheel spoke and is therefore optimally visible to the driver.

In the embodiment illustrated in FIG. 1, three additional switch elements 3a, 3b, 3c are arranged on a lateral edge 2 of the shift rocker 1. Here, the additional switch elements 3a, 3b, 3c are push-buttons.

For actuating the shift rocker 1, an actuating force has to be applied that is directed essentially vertically with respect to the plane of projection. For actuating the additional switch elements 3a, 3b, 3c, on the other hand, a pressure force has to be applied which is directed essentially transversely thereto. An unintentional actuation of the shift rocker by actuating the switch elements 3a, 3b, 3c is thereby almost impossible.

FIG. 2 illustrates a variant of the embodiment of FIG. 1, wherein one assigned display device is assigned, respectively, to the three additional switch elements 4a, 4b, 4c. In this case, the two displays 4b, 4c are combined in a common display arrangement.

FIG. 3 shows a further variant of a shift rocker 1, wherein a knurled wheel 5 as well as a double push button 6 (rocker switch) are provided instead of push buttons. By way of the knurled wheel 5, the volume, for example, of an audio system, can be changed.

FIG. 4 illustrates an embodiment wherein a left shift rocker 1l and a right shift rocker 1r are provided on the steering wheel (not shown). The right shift rocker 1r also has a display 7 in which the currently engaged transmission gear is displayed. Both shift rockers have several LEDs 8, 9 which may be used as a shift point display, for example, by means of a color logic.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a steering wheel, the vehicle comprising:
   a gear shift element pivotally arrangeable on a side of the steering wheel facing away from a driver of the vehicle, wherein the gear shift element is configured to electrically shift a transmission of the vehicle, wherein actuation of the gearshift element shifts the transmission in an electrically controlled manner from one transmission gear to a next-higher or a next-lower transmission gear; and
   each of an electric switch element and optical display device operatively arranged on the gearshift element, and wherein the optical display device is operatively arranged on a front face of the gearshift element that is visible to the driver of the vehicle,
   wherein the optical display device is integrated in the electric switch element and comprises a gearshift recommendation display.

2. The vehicle according to claim 1, wherein the electric switch element is operatively configured and arranged such that a force required for actuating the electric switch element does not cause an actuation of the gearshift element.

3. The vehicle according to claim 2, wherein a direction of force to be applied for actuating the electric switch element is substantially perpendicular to a direction of force to be applied for actuating the gearshift element.

4. The vehicle according to claim 1, wherein a direction of force to be applied for actuating the electric switch element is substantially perpendicular to a direction of force to be applied for actuating the gearshift element.

5. The vehicle according to claim 4, wherein the electric switch element is operatively arranged in an edge area of the gearshift element.

6. The vehicle according to claim 5, wherein the edge area is one of a lateral, an upper, and a lower edge of the gearshift element.

7. The vehicle according to claim 1, wherein the electric switch element is operatively arranged in an edge area of the gearshift element.

8. The vehicle according to claim 1, wherein the electric switch element is a push button switch.

9. The vehicle according to claim 1, wherein the electric switch element is a rocker switch providing two push buttons.

10. The vehicle according to claim 1, wherein the electric switch element comprises at least a segment of a knurled wheel.

11. The vehicle according to claim 1, further comprising:
a menu driven selection or information system; and
wherein the electric switch element is operatively configured for selecting menus of the selection or information system.

12. The vehicle according to claim 1, wherein the optical display device comprises a light-emitting diode.

13. The vehicle according to claim 1, wherein the optical display device comprises one of an OLED display and a luminous foil display.

14. The vehicle according to claim 1, wherein several electric switch elements and several optical display devices are provided, each one of the optical display devices being logically assigned to a respective one of the switch elements.

15. The vehicle according to claim 1, wherein several electric switch elements and several optical display devices are provided, one of the optical display devices being logically assigned to all of the switch elements.

16. The vehicle according to claim 1, wherein the gearshift element is pivotable in two mutually opposite directions.

17. The vehicle according to claim 16, wherein the two mutually opposite directions are substantially along a driving direction axis of the vehicle.

\* \* \* \* \*